(12) United States Patent
Hasegawa (10) Patent No.: US 11,179,907 B2
(45) Date of Patent: Nov. 23, 2021

(54) DEVICE AND METHOD FOR FEEDING RUBBER SHEET MEMBER

(71) Applicant: The Yokohama Rubber Co., LTD., Tokyo (JP)

(72) Inventor: Haruhisa Hasegawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/056,406

(22) PCT Filed: Mar. 29, 2019

(86) PCT No.: PCT/JP2019/014107
§ 371 (c)(1),
(2) Date: Nov. 17, 2020

(87) PCT Pub. No.: WO2019/220792
PCT Pub. Date: Nov. 21, 2019

(65) Prior Publication Data
US 2021/0245464 A1    Aug. 12, 2021

(30) Foreign Application Priority Data

May 17, 2018 (JP) .............................. JP2018-095333

(51) Int. Cl.
*B29D 30/30* (2006.01)
*B65H 16/10* (2006.01)
(Continued)

(52) U.S. Cl.
CPC ........... *B29D 30/30* (2013.01); *B65H 16/106* (2013.01); *B65H 19/10* (2013.01); *B65H 20/06* (2013.01);
(Continued)

(58) Field of Classification Search
CPC ............ B29D 30/30; B29D 2030/3064; B65H 19/10; B65H 20/06; B65H 16/106;
(Continued)

(56) References Cited

U.S. PATENT DOCUMENTS

| 4,540,131 A | 9/1985 | Ishii et al. | |
| 4,951,892 A * | 8/1990 | Chaplin | B29D 30/3007 156/395 |
| 6,547,906 B1 * | 4/2003 | Kolker | B29D 30/44 156/123 |

FOREIGN PATENT DOCUMENTS

| JP | S59-004555 | 1/1984 |
| JP | S59-108652 | 6/1984 |

(Continued)

OTHER PUBLICATIONS

International Search Report for International Application No. PCT/JP2019/014107 dated Jun. 18, 2019, 3 pages, Japan.

*Primary Examiner* — Jeremy R Severson
(74) *Attorney, Agent, or Firm* — Thorpe North & Western (57) ABSTRACT

A device and a method for feeding a sheet material are provided. A conveying machine is disposed above a holding machine. A sensor detects a lateral position of a rubber sheet fed from the holding machine. At a position between a grip position below the conveying machine and a release position at an upstream side in a conveying direction above the conveying machine, a leading edge of the rubber sheet is gripped by a gripping machine. The gripping machine is revolved and moved to the release position using, as a revolution center, a position in a vertical direction midway between the grip position and the release position. The leading edge being released is pressed against a placement surface of the conveying machine by a pressing portion. The (Continued)

rubber sheet is placed on the placement surface and conveyed to a downstream side in the conveying direction by the conveying machine.

7 Claims, 9 Drawing Sheets

(51) Int. Cl.
 *B65H 23/038* (2006.01)
 *B65H 20/06* (2006.01)
 *B65H 19/10* (2006.01)

(52) U.S. Cl.
 CPC ... *B65H 23/038* (2013.01); *B29D 2030/3064* (2013.01); *B65H 2301/44322* (2013.01); *B65H 2301/522* (2013.01); *B65H 2701/175* (2013.01); *B65H 2801/93* (2013.01)

(58) Field of Classification Search
 CPC ............ B65H 23/038; B65H 2301/522; B65H 2801/93; B65H 2301/44322
 See application file for complete search history.

(56) References Cited

FOREIGN PATENT DOCUMENTS

| | | |
|---|---|---|
| JP | S61-173450 | 10/1986 |
| JP | 2000-296949 | 10/2000 |

\* cited by examiner

DEVICE AND METHOD FOR FEEDING RUBBER SHEET MEMBER

TECHNICAL FIELD

The present technology relates to a device and a method for feeding a rubber sheet member, and particularly relates to a device and a method for feeding a sheet member that can efficiently feed, in a compact space, a rubber sheet member wound in a roll shape while suppressing lateral displacement.

BACKGROUND ART

Various rubber sheet members are used in manufacturing rubber products such as tires. Examples of rubber sheet members include members formed only of unvulcanized rubber, members including unvulcanized rubber in which reinforcing wires such as steel cords or resin cords are embedded, and the like. A rubber product is completed by layering or splicing together the rubber sheet members and other members to form an unvulcanized molded article and vulcanizing the unvulcanized molded article.

In a manufacturing process, the rubber sheet members are folded or wound in a roll shape, and are then temporarily stored. A device for feeding is known that is used to place, on a conveyor, a rubber sheet member stored as folded and to convey the rubber sheet member to a next step (see Japan Unexamined Patent Publication No. S59-004555). In a case where a hook or a pressing roll sandwiching a leading edge portion of the rubber sheet member is horizontally moved toward the conveyor as the device for feeding proposed in Japan Unexamined Patent Publication No. S59-004555, the device has a wider range of motion, leading to a need for a large space for installation and operation of the device for feeding. In addition, in a case where the rubber sheet member is folded, it is difficult to smoothly draw the rubber sheet member out toward the conveyor, and this is disadvantageous when accurate positioning is required for a placement surface of the conveyor.

SUMMARY

The present technology provides a device and a method for feeding a sheet material that can efficiently feed, in a compact space, a rubber sheet member wound in a roll shape while suppressing lateral displacement.

A device for feeding a rubber sheet member includes a holding machine that holds a rubber sheet member wound in a roll shape, a conveying machine including a placement surface on which the rubber sheet member is placed, the conveying machine being disposed above the holding machine, a gripping machine that can grip and release a leading edge portion of the rubber sheet member, a revolution driving mechanism that uses, as a revolution center, a position in a vertical direction midway between a grip position set below the conveying machine and a release position set at an upstream side in a conveying direction above the conveying machine, and revolves and moves the gripping machine between the grip position and the release position, a sensor that detects, at a predetermined position between the grip position and the release position, a lateral position of the rubber sheet member fed out from the holding machine, and a pressing portion that can move closer to and away from the placement surface at near the release position. The leading edge portion of the rubber sheet member fed out from the holding machine is gripped by the gripping machine at the grip position, and in this state, the gripping machine is revolved and moved to the release position, the leading edge portion is pressed against the placement surface by the pressing portion at the release position, and then the rubber sheet member sequentially fed out from the holding machine is placed on the placement surface and conveyed to a downstream side in the conveying direction by the conveying machine.

A method for feeding a rubber sheet member according to an embodiment of the present technology includes disposing a conveying machine above a holding machine holding a rubber sheet member wound in a roll shape, the conveying machine including a placement surface on which the rubber sheet member is placed, setting a grip position below the conveying machine, setting a release position at an upstream side in a conveying direction above the holding machine, enabling a gripping machine to revolve and move between the grip position and the release position using, as a revolution center, a position in a vertical direction midway between the grip position and the release position, the gripping machine that can grip and release gripping a leading edge portion of the rubber sheet member, detecting by a sensor, at a predetermined position between the grip position and the release position, a lateral position of the rubber sheet member fed out from the holding machine, and gripping by the gripping machine, at the grip position, the leading edge portion of the rubber sheet member fed out from the holding machine, revolving and moving the gripping machine to the release position, pressing by a pressing portion, at the release position, the leading edge portion against the placement surface, then operating the conveying machine and sequentially paying out the rubber sheet member from the holding machine, and placing the rubber sheet member on the placement surface, and conveying by the conveying machine the rubber sheet member to a downstream side in the conveying direction.

According to an embodiment of the present technology, the leading edge portion of the rubber sheet member fed out from the holding machine is gripped by a gripping machine, and revolved and moved from the grip position below the conveying machine toward the release position above the conveying machine. Then, after the leading edge portion of the rubber sheet member released gripping is pressed against the placement surface of the conveying machine, the rubber sheet member sequentially fed out from the holding machine is placed on the placement surface and conveyed to a downstream side in the conveying direction by the conveying machine. Thus, a space required to move the rubber sheet member from the holding machine to the placement surface of the conveying machine is easily made compact, allowing the rubber sheet member to be efficiently conveyed. Additionally, with the sensor detecting, at the predetermined position between the grip position and the release position, the lateral position of the rubber sheet member fed out from the holding machine, a failure can be suppressed in which the rubber sheet member is displaced in the lateral direction beyond a tolerance range while being conveyed to the conveying destination.

DETAILED DESCRIPTION

A device and a method for feeding a rubber sheet member according to embodiments of the present technology will be described below based on the embodiments illustrating as a diagram of a case of manufacturing a tire.

In an embodiment of a device 1 for feeding a rubber sheet member (hereinafter, referred to as the device for feeding 1) illustrated in FIGS. 1 and 2 includes a holding machine 3 that holds a rubber sheet member S wound in a roll shape, a conveying machine 5 disposed above the holding machine 3, a gripping device 8 that can grip and release gripping a leading edge portion Sf of the rubber sheet member S, a revolution driving mechanism 9 that revolves and moves the gripping machine 8, a sensor 11 that detects the lateral position of the rubber sheet member S, and a pressing portion 12 disposed above the conveying machine 5. The components of the device for feeding 1 are installed in a main body frame 2. Examples of the rubber sheet member S include sheet members such as tread rubber and side rubber which are formed only of unvulcanized rubber, sheet members such as carcass materials and belt materials which include unvulcanized rubber in which reinforcing wires such as steel cords or resin cords are embedded, and the like.

The holding machine 3 includes a holding frame 3a, a core 3b such as a drum supported by the holding frame 3a, and a liner reel portion 3c. The core 3b and the liner reel portion 3c are rotatably supported. The rubber sheet member S is wound on the core 3b in a roll shape with a liner L interposed therein.

The holding frame 3a in this embodiment includes a roller attached to a lower end portion of the holding frame 3a and is movable to any position. Thus, the holding machine 3 has a structure in which the holding machine 3 is removably installed at a predetermined placement position formed on the main body frame 2. In a case where the holding machine 3 is installed at the predetermined placement position of the main body frame 2, the liner reel portion 3c is coupled by interposing a transmission gear to a liner drive motor 4 installed on the main body frame 2. The liner reel portion 3c is rotationally driven by the liner drive motor 4. In a case where the liner L is wound by the liner reel portion 3c, the rubber sheet member S is fed out from the holding machine 3 with liner L and the core 3b rotates. A suitable brake force that resists rotation is applied to the core 3b.

The conveying machine 5 includes a pair of pulleys 7 and a conveying belt 6 that is mounted between the pulleys 7. An upper surface of the conveying belt 6 corresponds to a placement surface 6a on which the rubber sheet member S is placed. One of the pulleys 7 is rotationally driven by a motor or the like, and the conveying belt 6, which is annular, rotates and travels. Note that in FIGS. 2 and 6, the center position of the conveying belt 6 in the lateral direction is indicated by a dot-dash line CL.

The gripping machine 8 includes a receiving portion 8b and a movable unit 8a that are disposed to face each other, and the movable portion 8a is moved closer to and away from the receiving portion 8b by a fluid cylinder or the like. In this embodiment, each of the receiving portion 8b and the movable portion 8a is a rod-like body extending in the lateral direction of the conveying belt 6. A rod of the fluid cylinder penetrates the receiving portion 8b, and the movable portion 8a is attached to the tip of the rod having penetrated the receiving portion 8b.

A revolution driving mechanism 9 revolving and moving the gripping machine 8 is disposed at an upstream side in the conveying direction (right side in the figure) of the conveying machine 5. The revolution driving mechanism 9 includes arcuate rotating gears 10a disposed to face each other with the conveying belt 6 interposed between the rotating gears 10a in the lateral direction, gear guides 10b along which each of the rotating gears 10a is guided, and a drive motor 10c revolving each rotating gear 10a. In this embodiment, a plurality of gear guides 10b are disposed at intervals in the circumferential direction along an inner circumferential surface of the rotating gear 10a.

Gear teeth are protrudingly provided on an outer circumferential surface of each rotating gear 10a at regular intervals in the circumferential direction, and a drive gear 10d that meshes with the gear teeth is provided. Each rotating gear 10a is coupled to the drive motor 10c by interposing the transmission gear, the drive gear 10d, and the like. The gripping machine 8 (the receiving portion 8b and the movable portion 8a) is mounted and attached to each rotating gear 10a.

A grip position P1 in which the leading edge portion Sf of the rubber sheet member S is gripped by the gripping machine 8 is set below the conveying machine 5. A release position P2 in which the leading edge portion Sf is released gripping from the gripping machine 8 is set at an upstream side in the conveying direction above the conveying machine 5. The gripping machine 8 can be revolved and moved between the grip position P1 and the release position P2 by the revolution driving mechanism 9 using, as a revolution center C, a position midway between the grip position P1 and the release position P2 in the vertical direction.

The sensor 11 detects, at a predetermined position between the grip position P1 and the release position P2, the lateral position of the rubber sheet member S fed out from the holding machine 3. Various types of the sensor 11 that can detect the lateral position of the rubber sheet member S can be used, and for example, a camera device that can acquire image data regarding the rubber sheet member S in a plan view can be used.

In this embodiment, the sensor 11 is disposed above an upstream end in the conveying direction of the conveying belt 6. A support roll 13 extending in the lateral direction of the conveying belt 6 is rotatably attached to the main body frame 2 at the upstream side with respect to the upstream end in the conveying direction of the conveying belt 6. In this embodiment, an adjustment mechanism 13a is provided that can move the support roll 13 in the extension direction of the support roll 13 (that is, in the lateral direction of the conveying belt 6).

The pressing portion 12 includes a pressing roller 12a and a fluid cylinder 12b with the pressing roller 12a attached to a rod tip. The pressing roller 12a extends in the lateral direction of the conveying belt 6. Actuation of the fluid cylinder 12b enables the pressing roller 12a to move closer to and away from the placement surface 6a at near the release position P2.

The control unit 14 controls movement of the liner drive motor 4, the conveying machine 5, the gripping machine 8, the revolution driving mechanism 9, the pressing portion 12, and the adjustment mechanism 13a. Detection data from the sensor 11 is input to the control unit 14.

Now, a method in which the rubber sheet member S wound on the holding machine 3 is placed on the placement surface 6a and fed to a conveying destination by the conveying machine 5.

Figure 1:
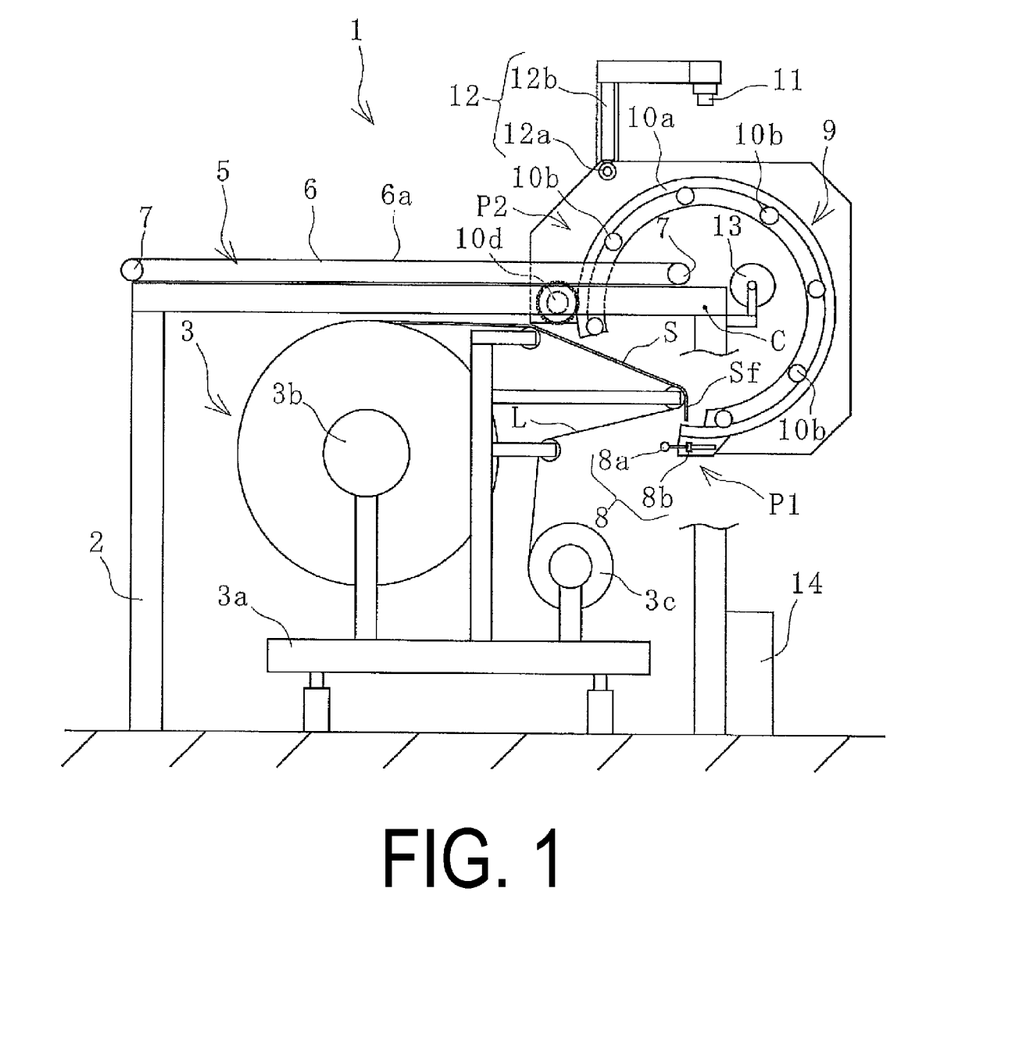
FIG. 1 is an explanatory diagram illustrating, in a side view, the internal structure of a device for feeding a rubber sheet member according to an embodiment of the present technology.
Figure 2:
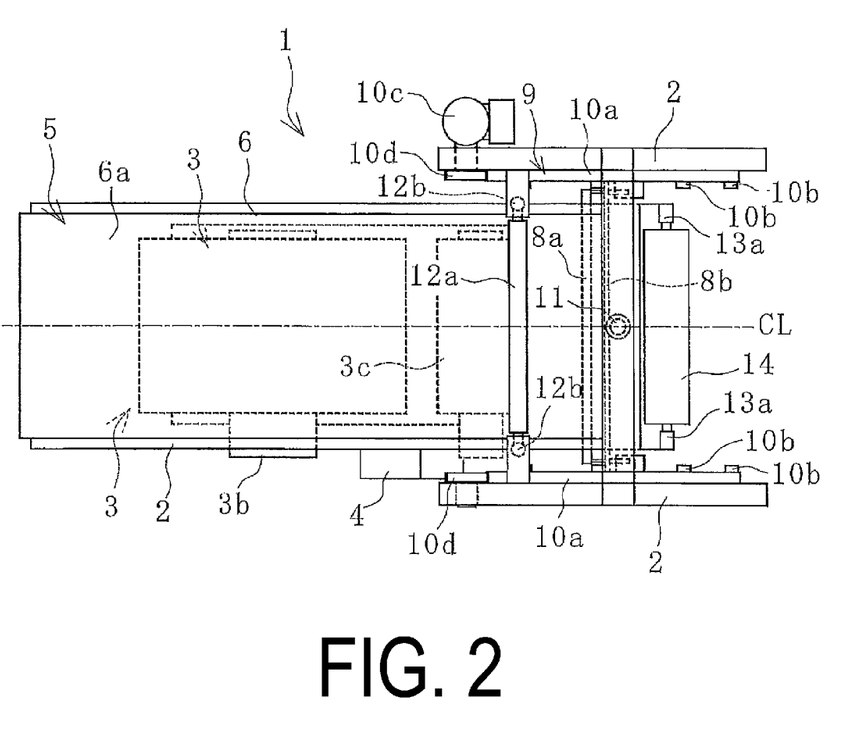
FIG. 2 is an explanatory diagram illustrating the device for feeding of FIG. 1 in a plan view.

First, as illustrated in FIGS. 1 and 2, the holding machine 3 including the rubber sheet member S wound in a roll shape with the liner L interposed therein is mounted at a predetermined placement position of the device for feeding 1. Accordingly, the holding machine 3 is fixed at a predetermined lateral position with respect to the conveying machine 5 (conveying belt 6). The gripping machine 8 is disposed in the grip position P1.

Figure 3:
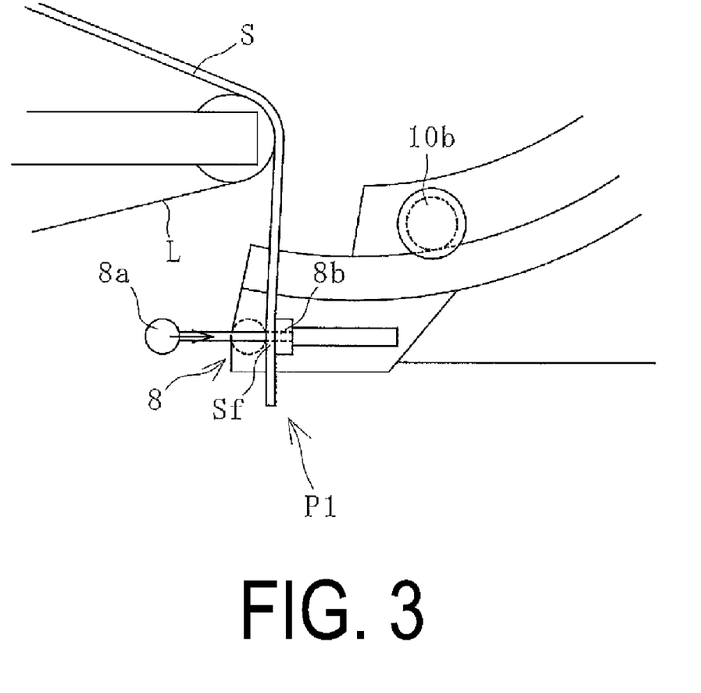
FIG. 3 is an enlarged explanatory diagram illustrating that a leading edge portion of a rubber sheet member is gripped by a gripping machine in a grip position by the device for feeding of FIG. 1.

Then, as illustrated in FIG. 3, the liner L and the rubber sheet member S are fed out from the holding machine 3, the leading edge portion of the liner L is wound around the liner reel portion 3c, and the leading edge portion Sf of the rubber sheet member S is inserted between the receiving portion 8b and the movable portion 8a. In this embodiment, the leading edge portion Sf is supported by and suspended from the roller at a position above the grip position P1, and can thus be easily inserted between the receiving unit 8b and the movable portion 8a. Subsequently, the movable portion 8a is moved closer to the receiving portion 8b, and the gripping machine 8 is used to grip the leading edge portion Sf. In this embodiment, the leading edge portion Sf is gripped by the gripping machine 8 over the entire lateral length.

Figure 4:
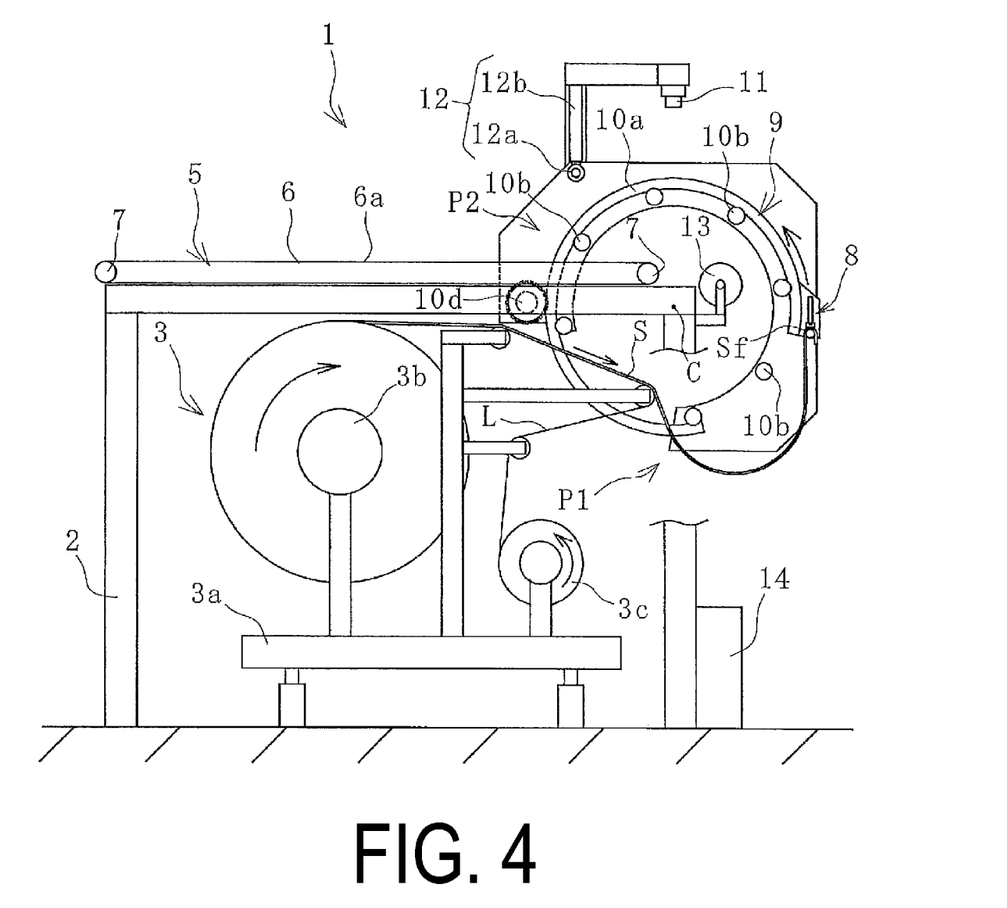
FIG. 4 is an explanatory diagram illustrating that the gripping machine of FIG. 3 is revolved and moved toward the release position.

Now, as illustrated in FIG. 4, the liner drive motor 4 is operated to wind the liner L on the liner reel portion 3c while paying out the liner L and the rubber sheet member S from the holding machine 3. Additionally, the drive motor 10c is operated to rotate the rotating gears 10a around the revolution center C with the gear guides 10b guiding the respective rotating gears 10a. Thus, the gripping machine 8 is revolved and moved from the grip position P1 toward the release position P2 around the revolution center C. In this process, for prevention of excessive tension from acting on the fed out rubber sheet member S, the speed of revolution of the gripping machine 8 is set lower than the speed of payout by the holding machine 3, and the rubber sheet member S is appropriately slackened between the holding machine 3 and the gripping machine 8.

Figure 5:
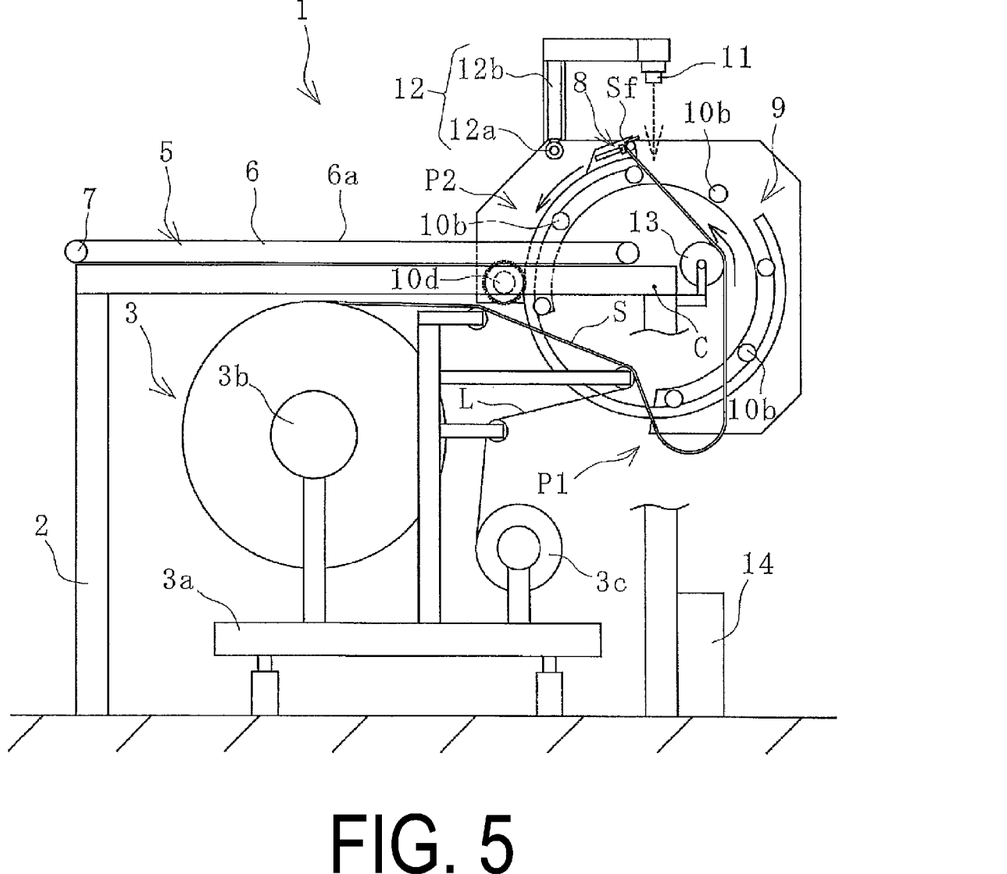
FIG. 5 is an explanatory diagram illustrating that, with the lateral position of the leading edge portion of the rubber sheet member of FIG. 4 detected by a sensor, the fed out rubber sheet member is centered.
Figure 6:
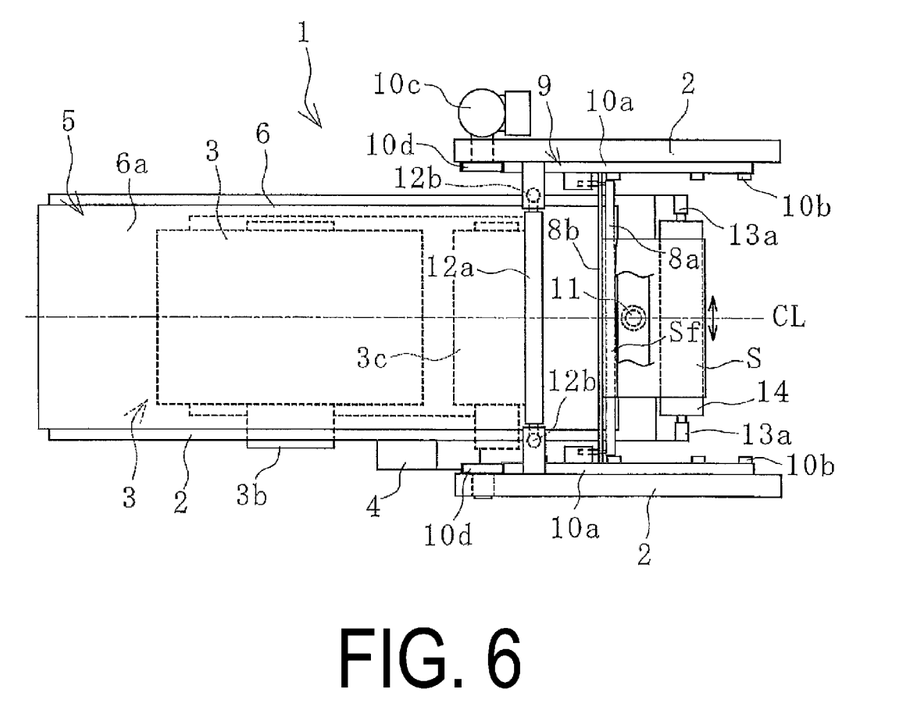
FIG. 6 is an explanatory diagram illustrating, in a plan view, the rubber sheet member being centered of FIG. 5.

As illustrated in FIGS. 5 and 6, while the gripping machine 8 is being revolved and moved toward the release position P2, the fed out rubber sheet member S is placed on the support roll 13. Then, the leading edge portion Sf is detected by the sensor 11. Detection data from the sensor 11 is input to the control unit 14, and the control unit 14 determines whether the lateral position of the rubber sheet member S is within a tolerance range with respect to the target position. For example, a center line is provided at the laterally central position of the rubber sheet member S, and determination is made of whether the center line coincides with a preset lateral position (for example, a laterally central position CL) of the conveying belt 6. Then, coincidence between the center line and the laterally central position CL indicates that the rubber sheet member S is appropriately centered with respect to the conveying belt 6, and significant deviation between the center line and the laterally central position CL indicates that the centering is poor.

In this embodiment, the control unit 14 actuates the adjustment mechanism 13a based on the detection data from the sensor 11 to move the support roll 13 in the extension direction of the support roll 13. Accordingly, the rubber sheet member S mounted on the support roll 13 is moved together with the support roll 13 to adjust the lateral position of the leading edge portion Sf to within the tolerance range with respect to the target position.

Alternatively or in addition to the adjustment mechanism 13a, the gripping machine 8 (the receiving portion 8b and the movable portion 8a) can be moved in the extension direction (that is, the lateral direction of the conveying belt 6) based on the detection data from the sensor 11. Accordingly, the gripping machine 8 can adjust the lateral direction of the leading edge portion Sf to within the tolerance range with respect to the target position.

In a case where the adjustment mechanism 13a is not provided, for example, in a case where the lateral position of the leading edge portion Sf detected by the sensor 11 lies outside the tolerance range with respect to the target position, the feeding of the rubber sheet member S from the holding machine 3 to the conveying machine 5 is stopped. Then, the process is started all over again from the step illustrated in FIG. 3 to allow the lateral position of the leading edge portion Sf to be adjusted to the target position.

Figure 7:
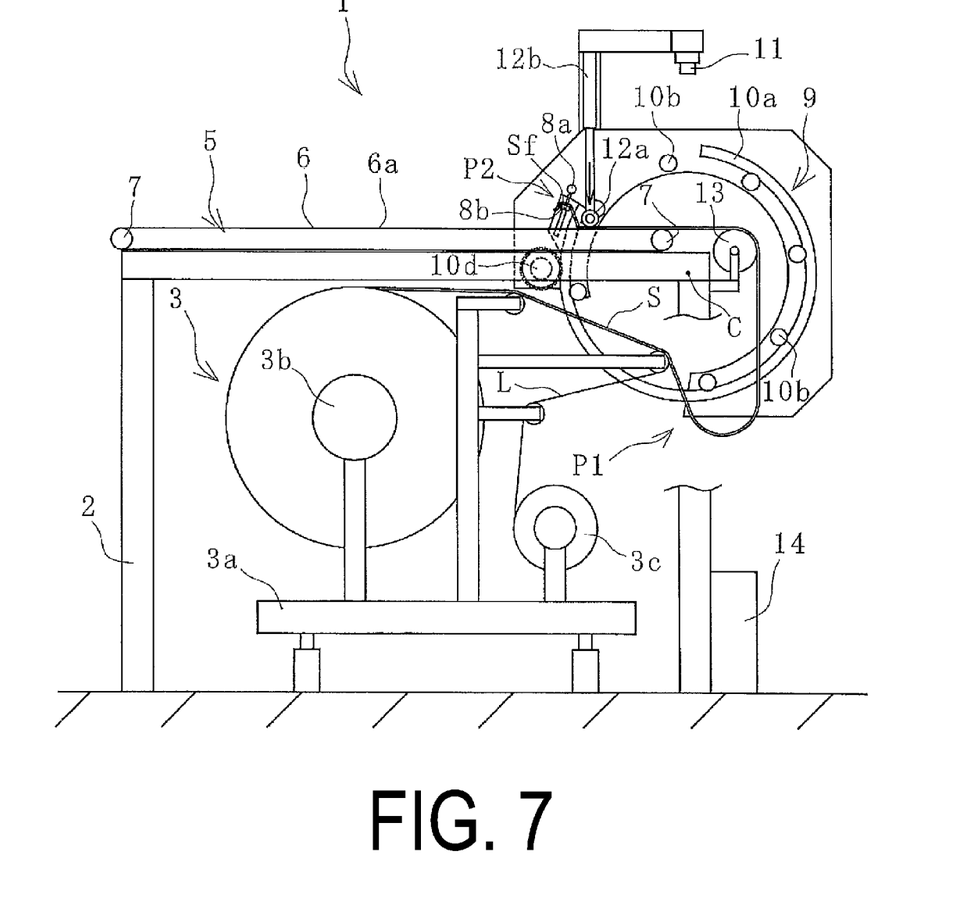
FIG. 7 is an explanatory diagram illustrating that the gripping machine of FIG. 5 is revolved and moved to the release position.

Then, as illustrated in FIG. 7, in a case where the gripping machine 8 moves to the release position P2, the movable portion 8a is moved away from the receiving portion 8b to release the leading edge portion Sf gripped by the gripping machine 8. The leading edge portion Sf released gripping from the gripping machine 8 remains inserted between the movable portion 8a and the receiving portion 8b, and is held by the gripping machine 8.

Then, the pressing roller 12a in a standby position is moved downward and closer to the placement surface 6a. The pressing roller 12a presses a rear section of the leading edge portion Sf of the rubber sheet member S against the placement surface 6a.

Figure 8:
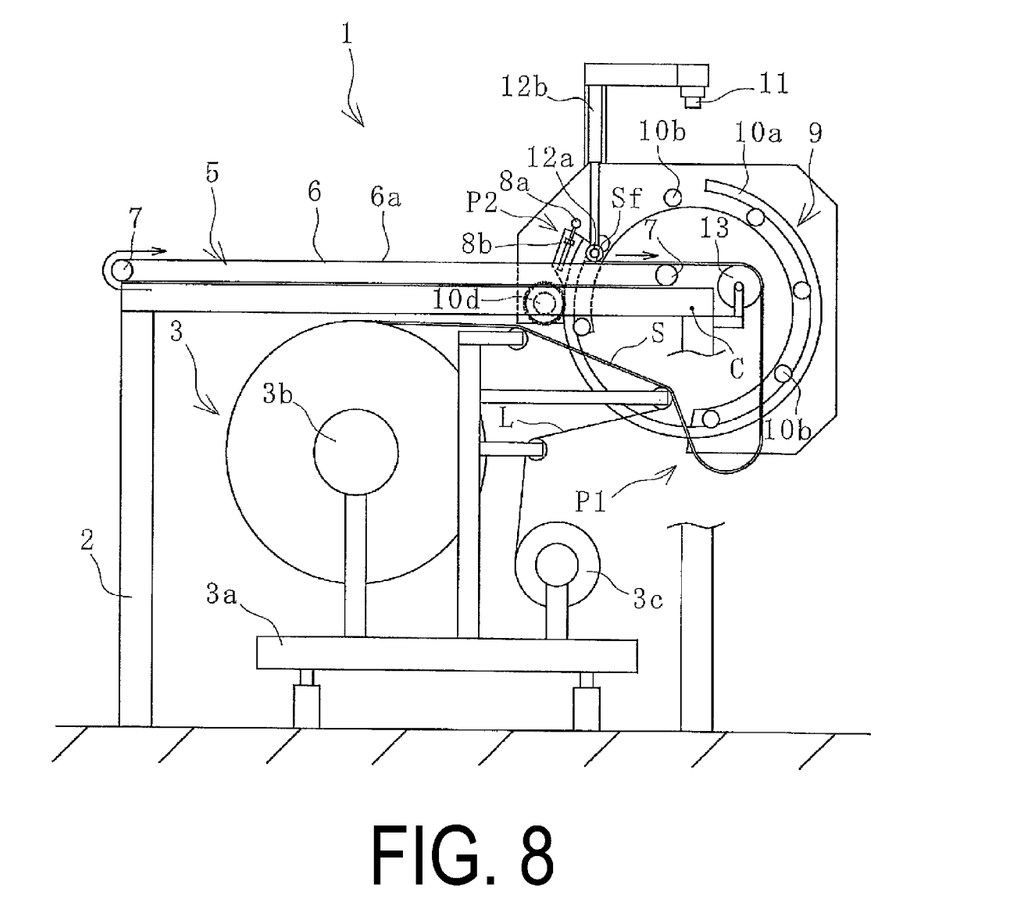
FIG. 8 is an explanatory diagram illustrating that the leading edge portion of the rubber sheet member of FIG. 7 is pressed against the placement surface by a pressing portion.

In this state, as illustrated in FIG. 8, the conveying machine 5 is caused to travel slightly to an upstream side in the conveying direction (right side in the drawing). Accordingly, the leading edge portion Sf is pulled out and off from between the receiving portion 8b and the movable portion 8a, and the most distal end portion of the leading edge portion Sf is laterally positioned at the target position of the placement surface 6a and is pressed by the pressing roller 12a. A pressing force exerted by the pressing roller 12a is set to a magnitude at which the leading edge portion Sf is prevented from being crushed. Note that, in the process illustrated in FIGS. 5 to 8, the liner drive motor 4 is essentially stopped instead of being operated.

Figure 9:
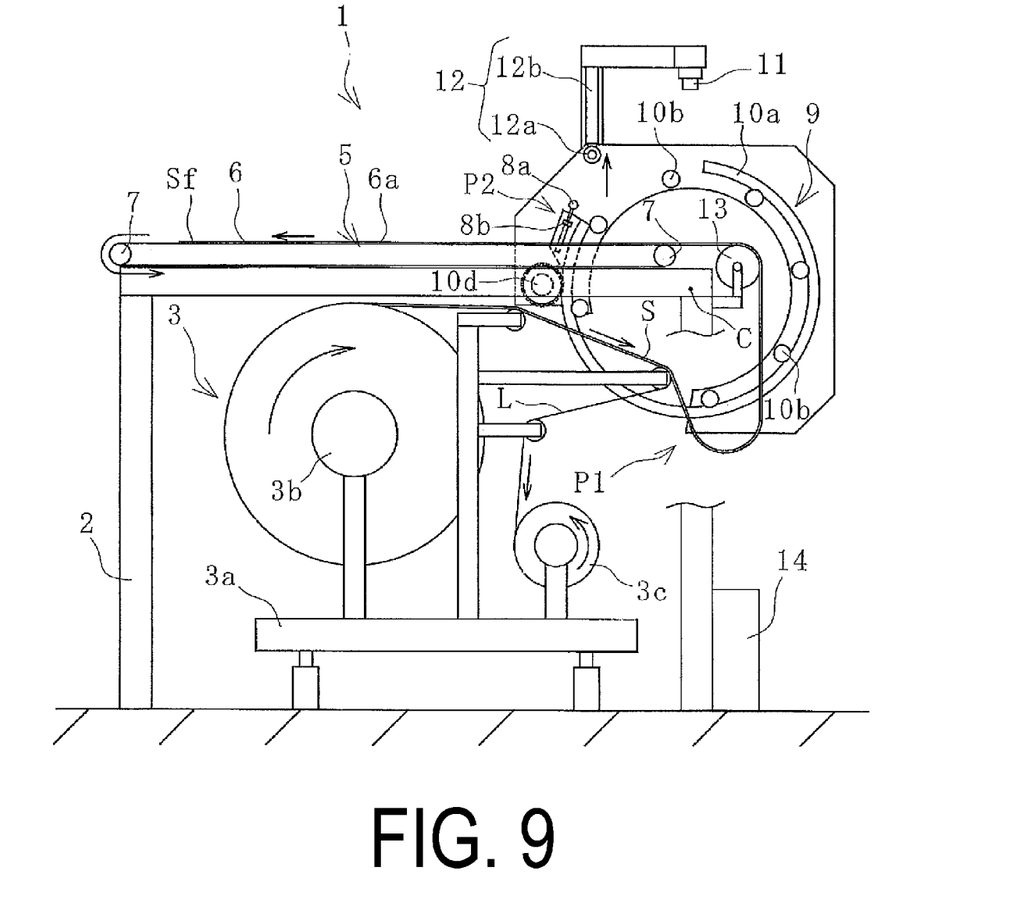
FIG. 9 is an explanatory diagram illustrating that the rubber sheet member of FIG. 8 is conveyed to a downstream side by a conveying machine.

Then, the pressing roller 12a is moved upward to move the pressing roller 12a away from the placement surface 6a and back to the standby position. Then, as illustrated in FIG. 9, the conveying machine 5 is caused to travel to a downstream side in the conveying direction (left side in the drawing), and the liner drive motor 4 is operated to continuously feed out the liner L and the rubber sheet member S from the holding machine 3. Accordingly, the rubber sheet member S sequentially fed out from the holding machine 3 is placed on the placement surface 6a, and conveyed to a downstream side in the conveying direction by the conveying machine 5, and fed to the next step.

The positioning (centering) of the rubber sheet member S will be described below in detail. In a case where the lateral position of the rubber sheet member S placed on the placement surface 6a deviates significantly from the target position, the conveying machine 5 is controlled as follows. After the rubber sheet member S is caused to travel to an upstream side in the conveying direction as illustrated in FIG. 8, the rubber sheet member S is caused to travel a predetermined distance with the traveling direction alternately switched between a downstream side and an upstream side. At this time, the lateral position of the rubber sheet member S placed on the placement surface 6a is detected by the sensor 11. Based on the detection data from the sensor 11, the support roll 13a is moved in the extension direction of the support roll 13a to allow the lateral position of the rubber sheet member S to be set within the tolerance range with respect to the target position.

As described above, while being gripped by the gripping machine 8, the leading edge portion Sf of the rubber sheet member S fed out from the holding machine 3 is revolved and moved from the grip position P1 toward the release position P2 around the revolution center C. Then, after the leading edge portion Sf is pressed against and positioned on the placement surface 6a, the rubber sheet member S sequentially fed out from the holding machine 3 is placed on the placement surface 6a and conveyed to a downstream side in the conveying direction by the conveying machine 5, The space required to move the rubber sheet member S from the holding machine 3 to the placement surface 6a can be made compact, allowing the rubber sheet member S to be efficiently conveyed within a reduced range of motion. Additionally, with the sensor 11 detecting the lateral position of the rubber sheet member S fed out from the holding machine 3, a failure can be suppressed in which the rubber sheet member S is displaced in the lateral direction beyond the tolerance range while being conveyed to the conveying destination.

The grip width over which the leading edge portion Sf is gripped by the gripping machine 8 can be set to, for example, 500 mm or more or 700 mm or more. The upper limit of the grip width is, for example, 1500 mm. This specification allows even a wide rubber sheet member S to be moved from the holding machine 3 to the conveying machine 5 with possible wrinkles and strain suppressed and to be quickly fed to the next step.

The invention claimed is:

1. A device for feeding a rubber sheet member comprising:
   a holding machine that holds a rubber sheet member wound in a roll shape;
   a conveying machine comprising a placement surface on which the rubber sheet member is placed, the conveying machine being disposed above the holding machine;
   a gripping machine that can grip and release a leading edge portion of the rubber sheet member;
   a revolution driving mechanism that uses, as a revolution center, a position in a vertical direction midway between a grip position set below the conveying machine and a release position set at an upstream side in a conveying direction above the conveying machine, and revolves and moves the gripping machine between the grip position and the release position;
   a sensor that detects, at a predetermined position between the grip position and the release position, a lateral position of the rubber sheet member fed out from the holding machine; and
   a pressing portion that can move closer to and away from the placement surface at near the release position, wherein
   the leading edge portion of the rubber sheet member fed out from the holding machine is gripped by the gripping machine at the grip position, and in this state, the gripping machine is revolved and moved to the release position, the leading edge portion is pressed against the placement surface by the pressing portion at the release position, and then the rubber sheet member sequentially fed out from the holding machine is placed on the placement surface and conveyed to a downstream side in the conveying direction by the conveying machine.

2. The device for feeding a rubber sheet member according to claim 1, wherein the leading edge portion released gripping from the gripping machine at the release position of gripping is held by the gripping machine, and a rear section of the leading edge portion is pressed against the placement surface by a pressing roller included in the pressing portion, and in this state, the conveying machine is caused to travel to an upstream side in the conveying direction removing the leading edge portion from the gripping machine, and the leading edge portion is pressed against the placement surface by the pressing roller.

3. The device for feeding a rubber sheet member according to claim 1, wherein the lateral position of the rubber sheet member fed out from the holding machine between the grip position and the release position is adjusted to a target position based on detection data from the sensor.

4. The device for feeding a rubber sheet member according to claim 1, wherein a grip width over which the leading edge portion of the rubber sheet member is gripped by the gripping machine is set to 500 mm or more.

5. A method for feeding a rubber sheet member comprising:
   disposing a conveying machine above a holding machine holding a rubber sheet member wound in a roll shape, the conveying machine comprising a placement surface on which the rubber sheet member is placed;
   setting a grip position below the conveying machine;
   setting a release position at an upstream side in a conveying direction above the holding machine;
   enabling a gripping machine to revolve and move between the grip position and the release position using, as a revolution center, a position in a vertical direction midway between the grip position and the release position, the gripping machine that can grip and release gripping a leading edge portion of the rubber sheet member;
   detecting by a sensor, at a predetermined position between the grip position and the release position, a lateral position of the rubber sheet member fed out from the holding machine, and griping by the gripping machine, at the grip position, the leading edge portion of the rubber sheet member fed out from the holding machine;
   revolving and moving the gripping machine to the release position;
   pressing by a pressing portion, at the release position, the leading edge portion against the placement surface, then operating the conveying machine and sequentially paying out the rubber sheet member from the holding machine, and placing the rubber sheet member on the placement surface; and conveying by the conveying machine the rubber sheet member to a downstream side in the conveying direction.

6. The device for feeding a rubber sheet member according to claim 2, wherein the lateral position of the rubber sheet member fed out from the holding machine between the grip position and the release position is adjusted to a target position based on detection data from the sensor.

7. The device for feeding a rubber sheet member according to claim 6, wherein a grip width over which the leading edge portion of the rubber sheet member is gripped by the gripping machine is set to 500 mm or more.

* * * * *